(12) United States Patent
Bittar et al.

(10) Patent No.: US 8,174,265 B2
(45) Date of Patent: *May 8, 2012

(54) ANTENNA CUTOUT IN A DOWNHOLE TUBULAR

(75) Inventors: Michael S. Bittar, Houston, TX (US); Randal Thomas Beste, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 412 days.

This patent is subject to a terminal disclaimer.

(21) Appl. No.: 11/997,988

(22) PCT Filed: Aug. 4, 2006

(86) PCT No.: PCT/US2006/030489
§ 371 (c)(1),
(2), (4) Date: Sep. 5, 2008

(87) PCT Pub. No.: WO2007/149106
PCT Pub. Date: Dec. 27, 2007

(65) Prior Publication Data
US 2009/0015260 A1      Jan. 15, 2009

Related U.S. Application Data

(60) Provisional application No. 60/805,176, filed on Jun. 19, 2006.

(51) Int. Cl.
*G01V 3/12* (2006.01)
*G01V 3/18* (2006.01)

(52) U.S. Cl. ........................ 324/338; 324/339

(58) Field of Classification Search .......... 324/333, 324/334, 335, 336, 337, 338, 339, 340, 341, 324/342, 343; 702/7
See application file for complete search history.

(56) References Cited

U.S. PATENT DOCUMENTS

| | | | |
|---|---|---|---|
| 2,264,318 | A | 12/1941 | Lee |
| 2,964,698 | A | 12/1960 | Lehmberg, Jr. |
| 3,014,177 | A | 12/1961 | Hungerford et al. |
| 3,187,252 | A | 6/1965 | Hungerford |
| 3,377,549 | A | 4/1968 | Neman et al. |
| 3,510,757 | A | 5/1970 | Huston |
| 3,539,911 | A | 11/1970 | Youmans et al. |

(Continued)

FOREIGN PATENT DOCUMENTS

EP            0527089 A2      2/1993

(Continued)

OTHER PUBLICATIONS

"International Application No. PCT/US2006/030489 Demand filed Apr. 5, 2007", 13 pgs.

(Continued)

*Primary Examiner* — Reena Aurora
(74) *Attorney, Agent, or Firm* — Schwegman, Lundberg & Woessner, P.A.

(57) ABSTRACT

In some embodiments, an apparatus (200) includes a tubular to operate downhole. The tubular has a longitudinal axis and has a cutout (210N) that has a direction that is other than 90 degrees to the longitudinal axis of the tubular. The apparatus also includes an antenna (202A) positioned in the cutout of the tubular. The antenna is to perform at least one of a transmission or reception of an electromagnetic signal that has a path that is to traverse a subsurface formation.

22 Claims, 7 Drawing Sheets

U.S. PATENT DOCUMENTS

| | | | |
|---|---|---|---|
| 3,808,520 | A | 4/1974 | Runge |
| 4,319,191 | A | 3/1982 | Meador et al. |
| 4,360,777 | A | 11/1982 | Segesman |
| 4,401,947 | A | 8/1983 | Cox |
| 4,494,072 | A | 1/1985 | Jeter et al. |
| 4,511,843 | A | 4/1985 | Thoraval |
| 4,514,693 | A | 4/1985 | Meador |
| 4,536,714 | A | 8/1985 | Clark |
| 4,553,097 | A | 11/1985 | Clark |
| 4,636,731 | A | 1/1987 | Savage et al. |
| 4,651,101 | A | 3/1987 | Barber et al. |
| 4,659,992 | A | 4/1987 | Clark et al. |
| 4,780,857 | A | 10/1988 | Lyle et al. |
| 4,785,247 | A | 11/1988 | Meador et al. |
| 4,808,929 | A | 2/1989 | Oldigs |
| RE32,913 | E | 4/1989 | Clark |
| 4,845,433 | A | 7/1989 | Kleinberg et al. |
| 4,873,488 | A | 10/1989 | Barber et al. |
| 4,940,943 | A | 7/1990 | Bartel et al. |
| 4,949,045 | A | 8/1990 | Clark et al. |
| 4,962,490 | A | 10/1990 | Lyle et al. |
| 4,980,643 | A | 12/1990 | Gianzero et al. |
| 5,134,285 | A | 7/1992 | Perry et al. |
| 5,200,705 | A | 4/1993 | Clark et al. |
| 5,210,495 | A | 5/1993 | Hapashy et al. |
| 5,230,386 | A | 7/1993 | Wu et al. |
| 5,239,448 | A | 8/1993 | Perkins et al. |
| 5,241,273 | A | 8/1993 | Luling |
| 5,278,507 | A | 1/1994 | Bartel et al. |
| 5,389,881 | A | 2/1995 | Bittar et al. |
| 5,453,693 | A | 9/1995 | Sinclair et al. |
| 5,508,616 | A | 4/1996 | Sato et al. |
| 5,530,358 | A | 6/1996 | Wisler et al. |
| 5,550,473 | A | 8/1996 | Klein |
| 5,563,512 | A | 10/1996 | Mumby |
| 5,757,191 | A | 5/1998 | Gianzero |
| 5,781,436 | A | 7/1998 | Forgang et al. |
| 5,854,991 | A | 12/1998 | Gupta et al. |
| 5,886,526 | A | 3/1999 | Wu |
| 5,892,460 | A | 4/1999 | Jerabek et al. |
| 5,999,883 | A | 12/1999 | Gupta et al. |
| 6,044,325 | A | 3/2000 | Chakravarthy et al. |
| 6,163,155 | A | 12/2000 | Bittar |
| 6,181,138 | B1 | 1/2001 | Hagiwara et al. |
| 6,297,639 | B1 * | 10/2001 | Clark et al. ............... 324/338 |
| 6,304,086 | B1 | 10/2001 | Minerbo et al. |
| 6,351,127 | B1 | 2/2002 | Rosthal et al. |
| 6,476,609 | B1 | 11/2002 | Bittar |
| 6,788,065 | B1 * | 9/2004 | Homan et al. ............. 324/338 |
| 6,798,208 | B2 | 9/2004 | Omeragic |
| 6,819,111 | B2 | 11/2004 | Fanini et al. |
| 6,900,640 | B2 | 5/2005 | Fanini et al. |
| 6,911,824 | B2 | 6/2005 | Bittar |
| 6,969,994 | B2 | 11/2005 | Minerbo et al. |
| 7,019,528 | B2 * | 3/2006 | Bittar ......................... 324/337 |
| 7,138,803 | B2 * | 11/2006 | Bittar ......................... 324/337 |
| 7,265,552 | B2 * | 9/2007 | Bittar ......................... 324/337 |
| 7,557,579 | B2 * | 7/2009 | Bittar ......................... 324/337 |
| 7,659,722 | B2 * | 2/2010 | Bittar ......................... 324/337 |
| 2002/0008520 | A1 | 1/2002 | Clark et al. |
| 2002/0008521 | A1 | 1/2002 | Clark et al. |
| 2003/0076107 | A1 | 4/2003 | Fanini et al. |
| 2003/0229449 | A1 | 12/2003 | Merchant et al. |
| 2004/0155660 | A1 | 8/2004 | Omeragic |
| 2004/0196047 | A1 | 10/2004 | Fanini et al. |
| 2005/0006090 | A1 | 1/2005 | Chemali et al. |
| 2005/0024060 | A1 | 2/2005 | Bittar |
| 2005/0083063 | A1 | 4/2005 | Omeragic et al. |
| 2005/0140373 | A1 | 6/2005 | Li et al. |
| 2005/0218898 | A1 | 10/2005 | Fredette et al. |

FOREIGN PATENT DOCUMENTS

| | | |
|---|---|---|
| EP | 0840142 A2 | 5/1998 |
| GB | 2146126 A | 4/1985 |
| GB | 2344127 | 5/2000 |
| GB | 2361547 | 10/2001 |
| WO | WO-2007149106 A1 | 12/2007 |

OTHER PUBLICATIONS

"International Application No. PCT/US2006/030489 International Search Report and Written Opinion mailed Mar. 5, 2007", 12 pgs.

Bittar, M. S., et al., "A True Multiple Depth of Investigation Electromagnetic Wave Resistivity Sensor Theory, Experiment and Prototype Field Test Results", *SPE 22705, 66th Annual Technical Conference and Exhibition of the Society of Petroleum Engineers*, Dallas TX, (Oct. 6-9, 1993),171-176

Bittar, M. S., et al., "The Effects of Rock Anisotropy On MWD Electromagnetic Wave Resistivity Sensors", *The Log Analyst*, (Jan.-Feb. 1996),20-30.

Bonner, S., et al., "A New Generation of Electrode Resistivity Measurements for Formation Evaluation While Drilling", *SPWLA 35th Annual Logging Symposium*, (Jun. 19-22, 1994),1-19.

Hagiwara, T., "A New Method to Determine Horizontal-Resistivity In Anisotropic Formulations Without Prior Knowledge of Relative Dip", *37th Annual SPWLA Logging Symposium*, New Orleans, LA, (Jun. 16-19, 1996).

Luling, M. G., et al., "Processing and Modeling 2-MHz Resistivity Tools in Dipping, Lasminated Anisotropic Formations", *SPWLA 35th Annual Logging Symposium*, (Jun. 19-22, 1994),1-25.

Mack, S. G., et al., "MWD Tool Accurately Measures Four Resistivities", *Oil & Gas Journal*, (May 25, 1992),1-5.

Zhu, T., et al., "Two Dimensional Velocity Inversion and Synthetic Seismogram Computation", *Geophysics*, vol. 52, No. 1, (Jan. 1987),37-49.

"U.S. Appl. No. 11/784,219, Non-Final Office Action mailed Aug. 20, 2009", 5 pgs.

"U.S. Appl. No. 11/784,219, Examiner Interview Summary mailed Mar. 24, 2010", 2 pgs.

"Australian Application Serial No. 2006344741, First Examiner Report mailed Apr. 20, 2010", 2 pgs.

"Chinese Application Serial No. 200680054970.3, Office Action mailed Oct. 27, 2010", 3 pgs.

"Chinese Application Serial No. 200680054970.3, Office Action Response Filed Feb. 18, 2011", 9 pgs.

"International Application Serial No. PCT/US2006/030489, International Preliminary Report on Patentability mailed Aug. 25, 2008", 11 pgs.

"Malaysian Application Serial No. PI 20070800, Office Action mailed Jul. 16, 2010", 3 pgs.

Coope, D., et al., "The Theory of 2 MHz Resistivity Tool and its Application to Measurement-While-Drilling", The Log Analyst, vol. XXV, No. 3, (May-Jun. 1984), 35-46.

"Australian Application Serial No. 2006344741, Response filed May 20, 2011 to office action mailed Mar. 18, 2011", 10 pgs.

"Australian Application U.S. Appl. No. 2006344741, Examiner Report mailed 03-18-11", 2 pgs.

* cited by examiner

ANTENNA CUTOUT IN A DOWNHOLE TUBULAR

RELATED APPLICATIONS

This application is a U.S. National Stage Filing under 35 U.S.C. 371 from International Application Number PCT/US2006/030489, filed Aug. 4, 2006 and published in English as WO 2007/149106 A1 on Dec. 27, 2007, which claims the benefit of U.S. Provisional Application, Ser. No. 60/805,176, filed Jun. 19, 2006, under 35 U.S.C. 119(e), which applications and publication are incorporated herein by reference in their entirety.

TECHNICAL FIELD

The application relates generally to downhole drilling. In particular, the application relates to formation evaluation for downhole drilling.

BACKGROUND

During drilling operations for extraction of hydrocarbons, electromagnetic radiation can be used to provide an indication of electrical resistivity of the subsurface formation surrounding a borehole used for such extraction. This data regarding resistivity can then be used to determine the presence of hydrocarbons.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a tool 100 can be located in FIG. 1. However, reference numbers are the same for those elements that are the same across different Figures. In the drawings.

DETAILED DESCRIPTION

Methods, apparatus and systems for an antenna in a cutout of a tubular for downhole operations are described. In the following description, numerous specific details are set forth. However, it is understood that embodiments of the invention may be practiced without these specific details. In other instances, well-known circuits, structures and techniques have not been shown in detail in order not to obscure the understanding of this description. Some embodiments may be used in Measurement While Drilling (MWD), Logging While Drilling (LWD) and wireline operations.

This description of the embodiments is divided into five sections. The first section describes a MWD operating environment. The second section describes different configurations for cutouts in a tool in which antennas are disposed. The third section describes different configurations for sleeves that cover such cutouts. The fourth section describes a wireline operating environment. The fifth section provides some general comments.

MWD Operating Environment

Figure 1:
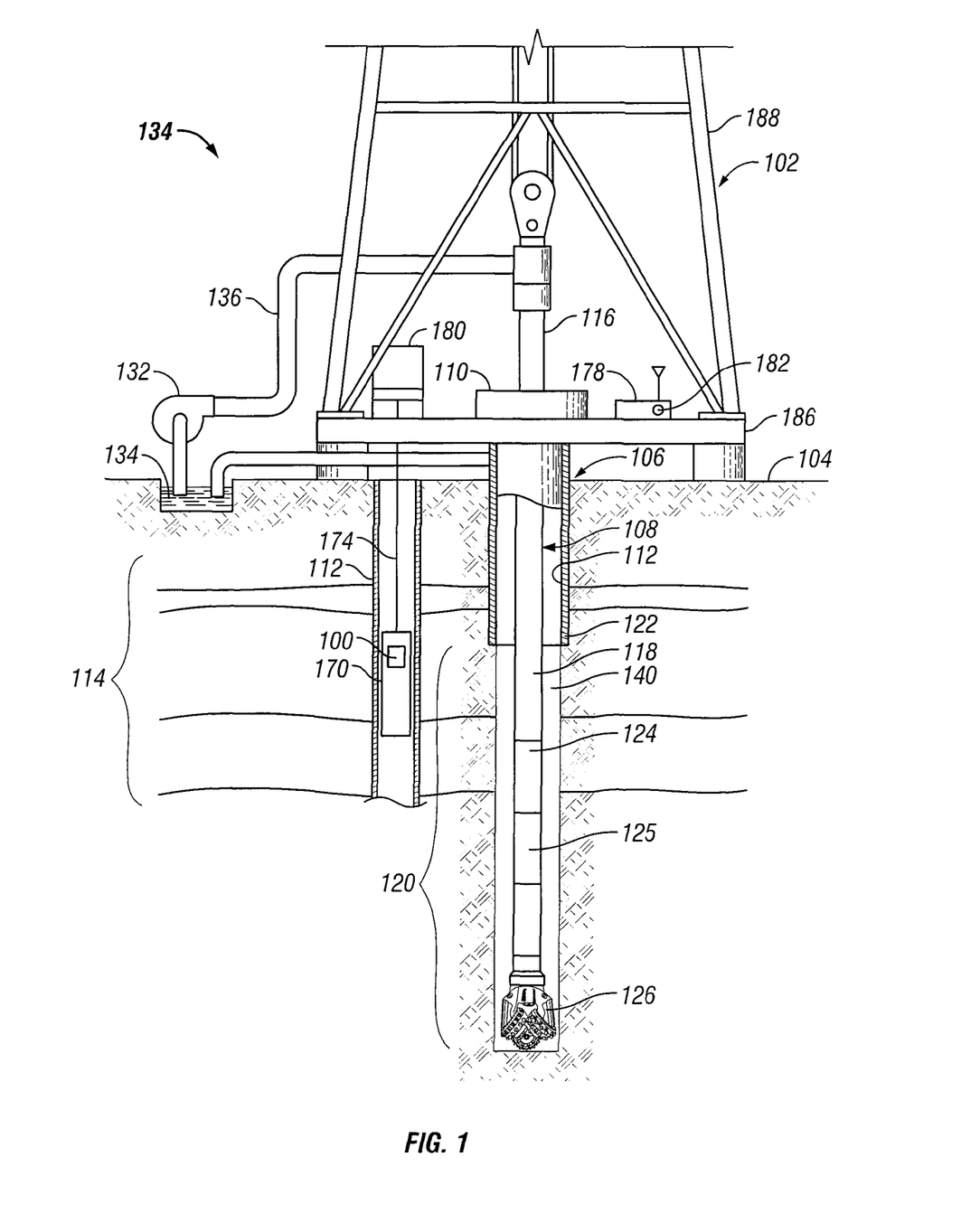
FIG. 1 illustrates a drilling well during Measurement While Drilling (MWD)/Logging While Drilling (LWD) operations that includes cutouts for antennas for electromagnetic wave resistivity, according to some embodiments of the invention.

A system operating environment, according to some embodiments, is now described. FIG. 1 illustrates a drilling well during Measurement While Drilling (MWD)/Logging While Drilling (LWD) operations that includes cutouts for antennas for electromagnetic wave resistivity, according to some embodiments of the invention.

It can be seen how a system 164 may also form a portion of a drilling rig 102 located at a surface 104 of a well 106. The drilling rig 102 may provide support for a drill string 108. The drill string 108 may operate to penetrate a rotary table 110 for drilling a borehole 112 through subsurface formations 114. The drill string 108 may include a Kelly 116, a drill pipe 118, and a bottom hole assembly 120, perhaps located at the lower portion of the drill pipe 118.

The bottom hole assembly 120 may include drill collars 122, a downhole tool 124, and a drill bit 126. The drill bit 126 may operate to create a borehole 112 by penetrating the surface 104 and subsurface formations 114. The downhole tool 124 may comprise any of a number of different types of tools including MWD (measurement while drilling) tools, LWD (logging while drilling) tools, and others. In some embodiments, the drill pipe 118 is a wired drill pipe for communications between the surface of the Earth to the downhole tool 124. In some embodiments, the downhole tool 124 may include one or more cutouts. A cutout in the downhole tool 124 may be used for the placement of a transmitter antenna or a receiver antenna. A more detailed description of the cutouts and the antennas therein are set forth below.

During drilling operations, the drill string 108 (perhaps including the Kelly 116, the drill pipe 118, and the bottom hole assembly 120) may be rotated by the rotary table 110. In addition to, or alternatively, the bottom hole assembly 120 may also be rotated by a motor (e.g., a mud motor) that is located downhole. The drill collars 122 may be used to add weight to the drill bit 126. The drill collars 122 also may stiffen the bottom hole assembly 120 to allow the bottom hole assembly 120 to transfer the added weight to the drill bit 126, and in turn, assist the drill bit 126 in penetrating the surface 104 and subsurface formations 114.

During drilling operations, a mud pump 132 may pump drilling fluid (sometimes known by those of skill in the art as "drilling mud") from a mud pit 134 through a hose 136 into the drill pipe 118 and down to the drill bit 126. The drilling fluid can flow out from the drill bit 126 and be returned to the surface 104 through an annular area 140 between the drill pipe 118 and the sides of the borehole 112. The drilling fluid may then be returned to the mud pit 134, where such fluid is filtered. In some embodiments, the drilling fluid can be used to cool the drill bit 126, as well as to provide lubrication for the drill bit 126 during drilling operations. Additionally, the drilling fluid may be used to remove subsurface formation 114 cuttings created by operating the drill bit 126.

The different components of FIG. 1 may all be characterized as "modules" herein. Such modules may include hardware circuitry, and/or a processor and/or memory circuits, software program modules and objects, and/or firmware, and combinations thereof, as desired by the architect of the systems shown in FIG. 1, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for drilling and logging operations, and thus, various embodiments are not to be so limited. The illustrations of the systems of FIG. 1 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, personal computers, workstations, vehicles, and conducting cables for a variety of electrical devices, among others. Some embodiments include a number of methods.

A number of transmitter antennas and receiver antennas may be disposed on the drill string 108. The transmitter antennas may emit transmitter electromagnetic waves which traverse the subsurface formation. Induced electromagnetic waves that are a result of the transmitter electromagnetic waves are received by the receiver antennas. Based on such electromagnetic radiation, resistivity of the subsurface formation may be determined. The antennas may be used to make resistivity determinations at multiple depths of investigation. The transmitter antennas and/or the receiver antennas may be positioned within circumferential cutouts spaced at different locations along the drill string. Example configurations are now described.

Cutouts in a Tool for Housing Antennas

Figure 2:
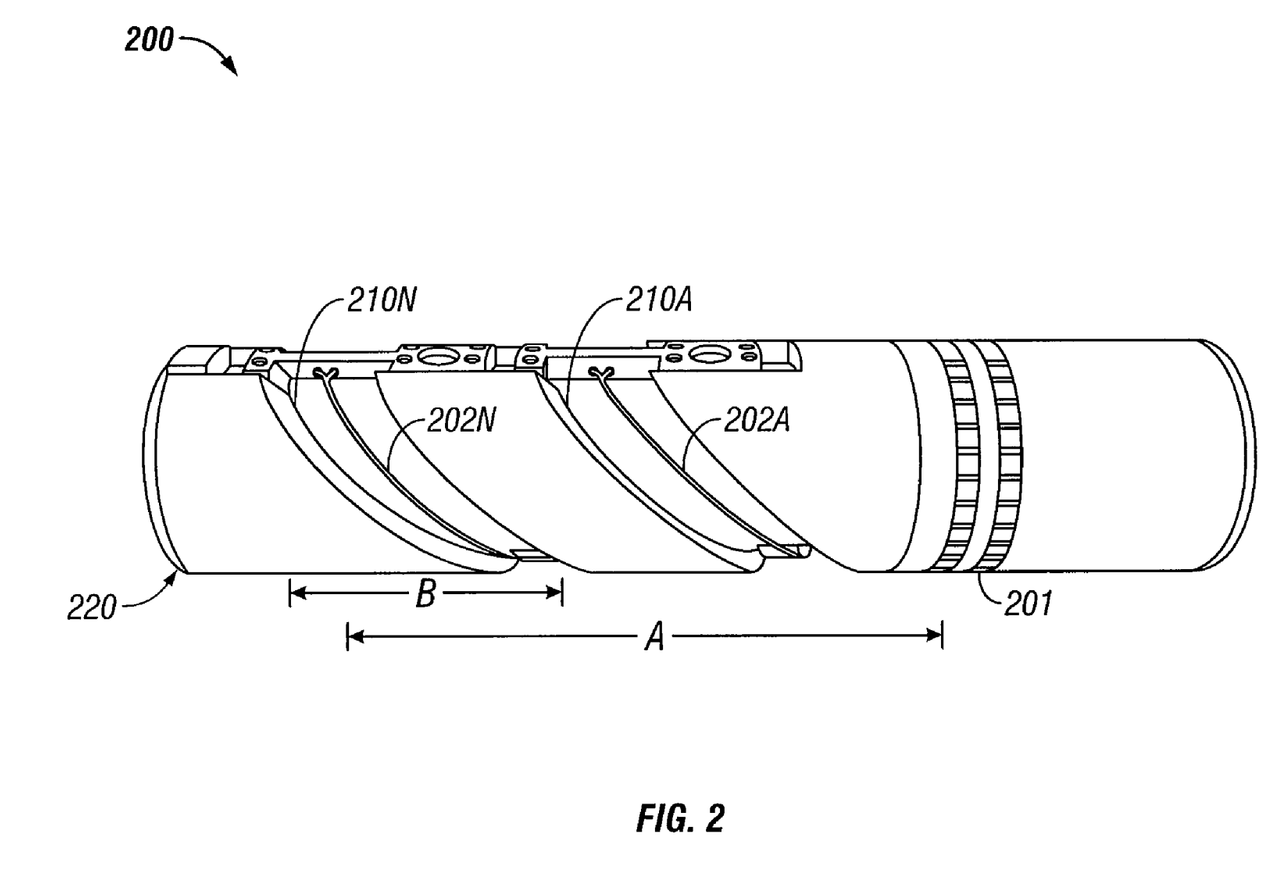
FIG. 2 illustrates a tool that is part of a tubular for downhole operations and having antennas in cutouts of the tool for electromagnetic wave resistivity, according to some embodiments of the invention.
Figure 3:
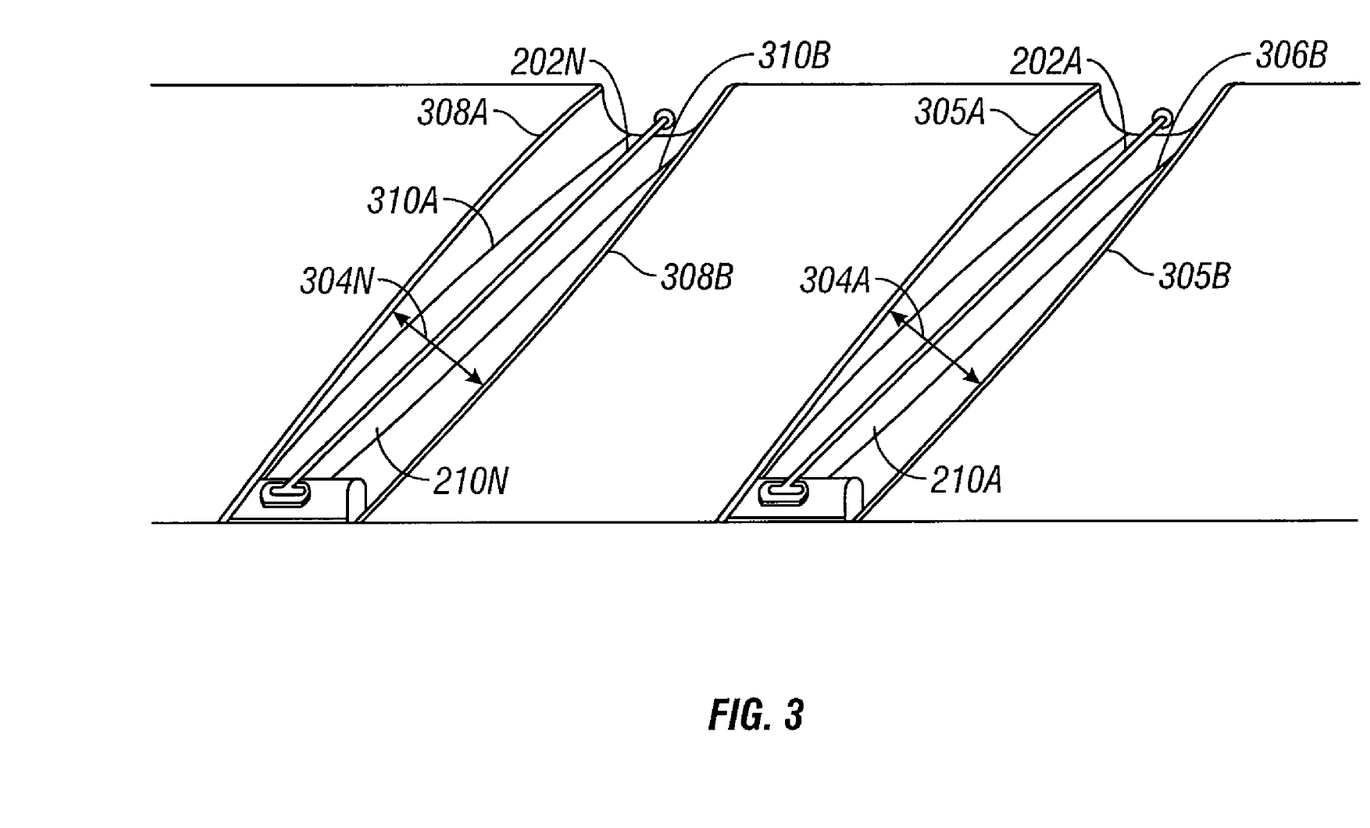
FIG. 3 illustrates a more detailed view of receiver antennas in cutouts of a tool for electromagnetic wave resistivity, according to some embodiments of the invention.
Figure 4:
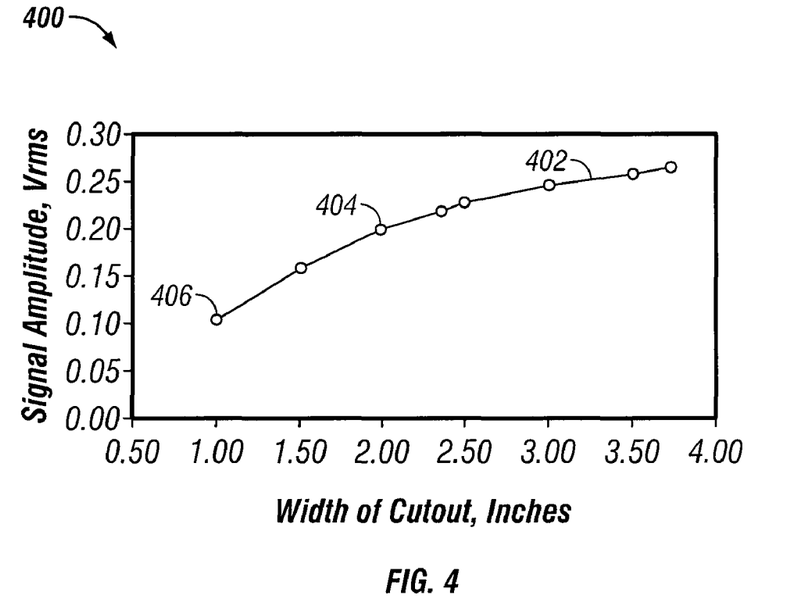
FIG. 4 illustrates a plot of electromagnetic signal strength versus a width of the cutout in the tool that has an antenna that generates the signal, according to some embodiments of the invention.
Figure 5:
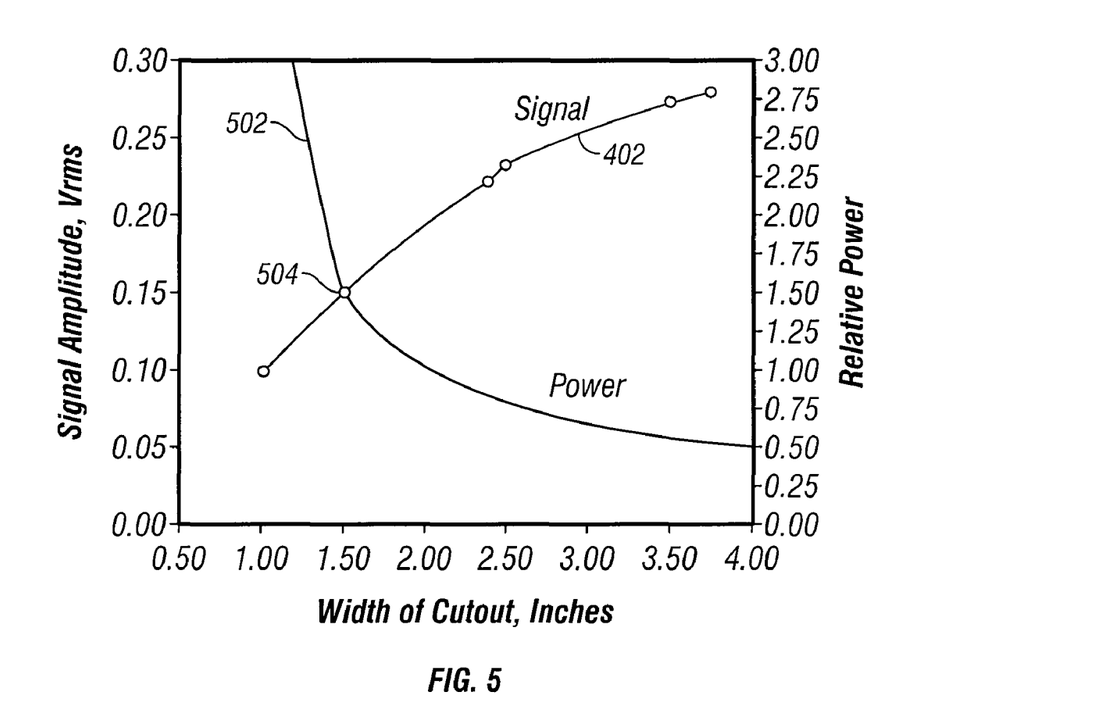
FIG. 5 illustrates a plot of electromagnetic signal strength and relative power versus a width of the cutout in the tool that has an antenna that generates the signal, according to some embodiments of the invention.
Figure 6:
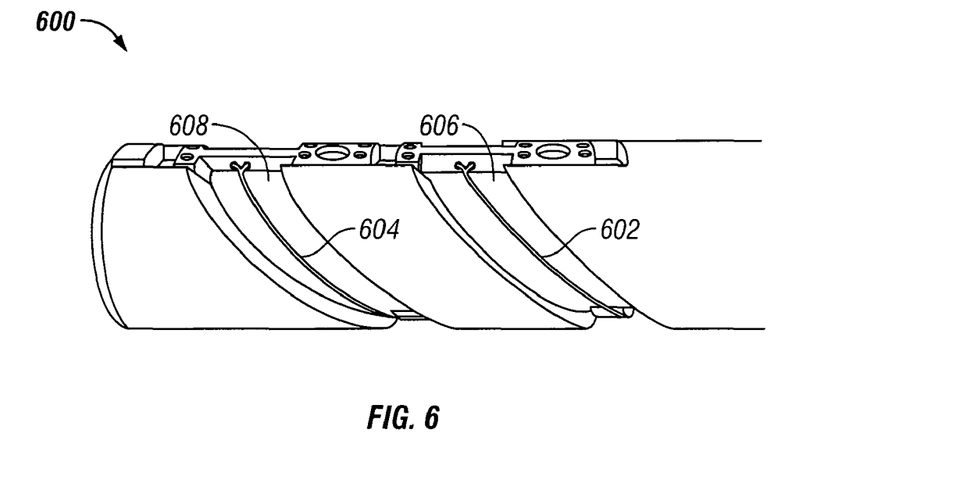
FIG. 6 illustrates a tool that is part of a tubular for downhole operations and having antennas in cutouts of the tool for electromagnetic wave resistivity, according to some other embodiments of the invention.
Figure 7:
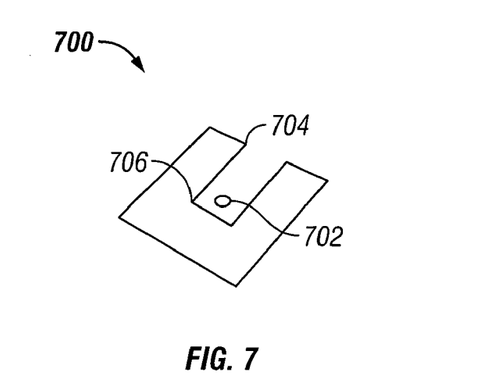
FIG. 7 illustrates a cross-section of a cutout in a tool having wall surfaces with approximately uniform width, according to some embodiments of the invention.
Figure 8:
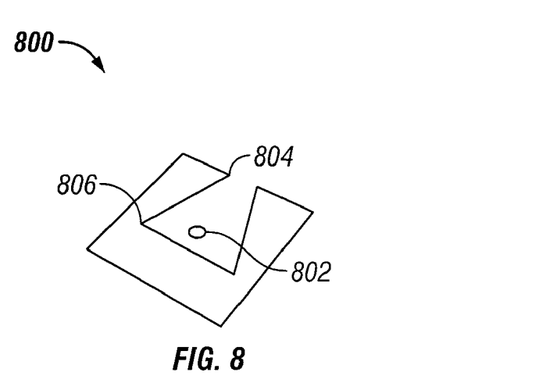
FIG. 8 illustrates a cross-section of a cutout in a tool having divergent wall surfaces, according to some embodiments of the invention.
Figure 9:
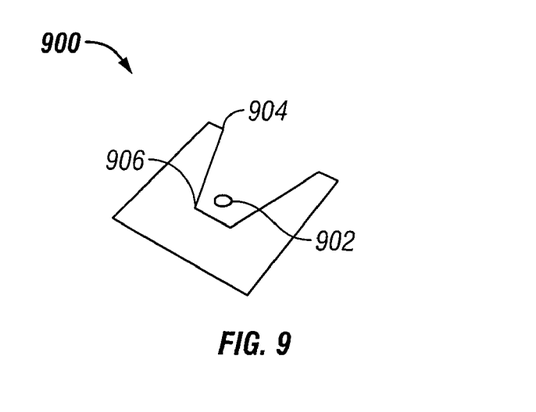
FIG. 9 illustrates a cross-section of a cutout in a tool having convergent wall surfaces, according to some embodiments of the invention.

The size of the cutouts is dependent on the mechanical, electrical and physics-based aspects of the tool and the antenna therein. In particular, if the cutouts are too wide, the structural integrity of the tool may be compromised. Conversely, if the cutouts are too narrow, the power needed to output a signal from the antennas that is at a sufficient level for formation evaluation may be too great. FIGS. 2, 3 and 6 illustrate different embodiments of the tool having cutouts with antennas disposed therein. FIGS. 4 and 5 illustrate plots of the electromagnetic signal strength, power and width of the cutout for a given configuration. FIGS. 7-9 illustrates different embodiments for the angles of the walls of the cutouts.

FIG. 2 illustrates a tool that is part of a tubular for downhole operations and having antennas in cutouts of the tool for electromagnetic wave resistivity, according to some embodiments of the invention. In particular, FIG. 2 illustrates a tool 200 that may be part of the drill string 108 (shown in FIG. 1). The tool 200 includes a transmitter antenna 201 that can be disposed circumferentially around the tool 200. As shown, the axis of the transmitter antenna 201 may be approximately perpendicular to the longitudinal axis of the tool 200. Alternatively, the axis of the transmitter antenna 201 may be at other angles relative to the longitudinal axis of the tool 200 (0 degrees, 45 degrees, 70 degrees, 90 degrees, etc.). While shown with one transmitter antenna 201, the tool 200 may include one to any number of transmitter antennas.

The transmitter antenna 201 may be one to a number of wire windings which may be in series or parallel. The wire windings may have one to a number of turns. In some embodiments, the transmitter antenna 201 comprises four turns of wire disposed around the circumference of the drill string. In some embodiments, each of the transmitter antennas may be selectively tuned to transmit electromagnetic signals or waves having one of three or more selected frequencies. Thus, while the depths of investigation of the tool may be controlled to some extent by spacing between the transmitter and receiver antennas, the depths of investigation may also be controlled by selecting an appropriate frequency. In some embodiments, each transmitter antenna may be tuned to transmit electromagnetic waves having a frequency being one of 2 mega-Hertz, 500 kilo-Hertz or 250 kilo-Hertz. Embodiments are not so limited, as different frequencies, and a greater selection of frequencies, may also be used.

The tool 200 also includes a cutout 210A and a cutout 210N. The cutout 210A and the cutout 210N are cut circumferentially around the tool 200. Moreover, the axis of the cutout 210A and the axis of the cutout 210N are off axis relative to the longitudinal axis of the tool 200. In some embodiments, the axis of the cutout 210A and the axis of the cutout 110N are at an approximately 45 degree angle relative to the longitudinal axis of the tool 200. In some embodiments, the axis of the cutout 210A and the axis of the cutout 210N can be at any angle relative to the longitudinal axis of the tool 200. For example, the angle may be approximately 5 degrees, 10 degrees, 15 degrees, 30 degrees, 70 degrees, 75 degrees, 85 degrees, etc. The angle of the axis of the cutout 210A may be independent of the angle of the axis of the cutout 210N. For example, the axis of the cutout 210A and the axis of the cutout 210N are at an approximately 45 degree angle and 50 degree angle, respectively, relative to the longitudinal axis of the tool 200. Moreover, the tool 200 may have one to any number of cutouts therein. A receiver antenna 202A is disposed or positioned in the cutout 204A. A receiver antenna 202N is disposed or positioned in the cutout 204N.

The receiver antenna 202A and the receiver antenna 202N may each comprise one or more loops of wire running along the circumference of the body of the tool 200. In some embodiments the spacing between the receiver antennas may be six inches, eight inches, 10 inches, etc. although any suitable spacing may be used. Each receiver antenna may couple to a reception circuit (not specifically shown) which, in combination with the receiver antennas, detects electromagnetic waves or electromagnetic radiation. Based on one or both of the amplitude and phase of received electromagnetic signals, the downhole tool 124 and/or surface electronics may be capable of determining the resistivity of the surrounding formations.

In some embodiments, the cutout 210A, the cutout 210N and the transmitter antenna 201 may be on different parts of the tool 200. For example, the cutout 210A, the cutout 210N and the transmitter antenna 201 may be on drill collars, stabilizers 220, etc. The diameter of drill collars that include such cutouts may be in a range of four to nine inches. For example, the diameter of the drill collar may be 4¾ inches, 6¾ inches, 7 inches, 8 inches, 9 inches, etc.

As shown, the distance from the transmitter antenna 201 to a midpoint (B/2) of the receiver antenna 202N (the receiver antenna that is farthest distance away) is A. In particular, because of the angle of the circumferential receiver antennas can be off axis relative to the longitudinal axis of the tool, the distance to the receiver antennas can vary around the circumference of the tool. Therefore, if the range of a circumferential receiver antenna along the longitudinal axis is B, the midpoint is B/2. In some embodiments, the distance A can be in a range of 6 to 112 inches. In some embodiments, the distance A is 6 inches, 16 inches, 32 inches, 48 inches, etc.

FIG. 3 illustrates a more detailed view of receiver antennas in cutouts of a tool for electromagnetic wave resistivity, according to some embodiments of the invention. In particular, FIG. 3 illustrates a more detailed view of the cutouts in the tool 200 of FIG. 2, according to some embodiments of the invention. The cutout 210A has an outer point 305A and an outer point 305B. The cutout 210A also has an inner point 306A and an inner point 306B. The cutout 210N has an outer point 308A and an outer point 308B. The cutout 210N also has an inner point 310A and an inner point 310B. Different angles of the walls for the cutouts 210 with regard to the inner and outer points are described in more detail below with the description of FIGS. 7-9.

The cutout 210A and the cutout 210N have a width 304A and a width 304N, respectively. In some embodiments, the width 304A and/or the width 304N are in a range of approximately one to four inches, a range of approximately two to four inches, a range of approximately one to four inches, approximately one to six inches, approximately two to six inches, approximately one to eight inches, approximately two to eight inches, etc. In some embodiments, the width 304A and/or the width 304N are approximately one inch, two inches, three inches, four inches, five inches, six inches, seven inches, eight inches, etc. In some embodiments, the antennas are positioned approximately in the center of the cutouts.

FIG. 4 illustrates a plot of electromagnetic signal strength versus a width of the cutout in the tool that has an antenna that receives the signal, according to some embodiments of the invention. In particular, FIG. 4 illustrates a plot 400 for a tool configured as follows. The tool includes a cutout and the receiver antenna therein that are offset 45 degrees relative to the longitudinal axis of the tool. The current of the transmitter antenna is approximately 50 milli-amperes. The transmitter antenna is operating to transmit an electromagnetic wave having a frequency of approximately two mega-Hertz. The spacing between the transmitter antenna and the receiver antenna is approximately 16 inches. The receiver antenna has a gain of approximately 1100. The number of turns for the transmitter antenna and the receiver antenna have four and three, respectively. The plot 400 includes a curve 402. At point 406 along the curve 402, where the width of the cutout is 1.00 inches, the amplitude of the signal is 0.10 Volts Root Mean Squared (RMS). At point 404 along the curve 402, where the width of the cutout is 2.00 inches, the amplitude of the signal is 0.20 Volts RMS. At point 408 along the curve 402, where the width of the cutout is 3.50 inches, the amplitude of the signal is approximately 0.27 Volts RMS. As shown, the strength of the signal begins to level off where the width of the cutout is around 2 inches.

FIG. 5 illustrates a plot of electromagnetic signal strength and relative power versus a width of the cutout in the tool that has an antenna that generates the signal, according to some embodiments of the invention. In particular, FIG. 5 illustrates a plot 500 that includes the curve 402 from FIG. 4 representing the signal strength relative to the width of the cutout. FIG. 5 also includes a curve 502 of the power of the signal relative to the width of the cutout. As shown in FIGS. 4 and 5, for this tool configuration (described above), an approximately two inch width for the cutout is a good compromise for the signal strength and the exposed antenna area. Reducing the width below one inch would require a significant increase in power to account for the loss of signal strength (as shown).

FIG. 6 illustrates a tool that is part of a tubular for downhole operations and having antennas in cutouts of the tool for electromagnetic wave resistivity, according to some other embodiments of the invention. In particular, FIG. 6 illustrates a tool 600 that may be part of the drill string 108 (shown in FIG. 1). The tool 600 includes a transmitter antenna 602 that can be disposed circumferentially in a cutout 606 around the tool 600. The axis of the transmitter antenna 602 and the axis of the cutout 606 may be at an approximately 45 degree angles relative to the longitudinal axis of the tool 600. In some embodiments, the axis of the cutout 606 can be at any angle relative to the longitudinal axis of the tool 600. For example, the angle may be approximately 5 degrees, 10 degrees, 15 degrees, 30 degrees, 70 degrees, 75 degrees, 85 degrees, etc. The angle of the axis of the cutout 606 may be independent of the angle of the axis of the antenna 602. For example, the axis of the cutout 606 and the axis of the antenna 602 are at an approximately 45 degree angle and 48 degree angle, respectively, relative to the longitudinal axis of the tool 600. While shown with one transmitter antenna 201, the tool 200 may include one to any number of transmitter antennas positioned in cutouts.

The transmitter antenna 602 may be one to a number of wire windings which may be in series or parallel. The wire windings may have one to a number of turns. In some embodiments, the transmitter antenna 602 comprises four turns of wire disposed around the circumference of the drill string. In some embodiments, each of the transmitter antennas may be selectively tuned to transmit electromagnetic signals or waves having one of three or more selected frequencies. Thus, while the depths of investigation of the tool may be controlled to some extent by spacing between the transmitter and receiver antennas, the depths of investigation may also be controlled by selecting an appropriate frequency. In some embodiments, each transmitter antenna may be tuned to transmit electromagnetic waves having a frequency being one of 2 mega-Hertz, 500 kilo-Hertz or 250 kilo-Hertz. Embodiments are not so limited, as different frequencies, and a greater selection of frequencies, may also be used.

The tool 600 also includes a cutout 608 that includes a receiver antenna 604 positioned or disposed therein. The cutout 608 is cut circumferentially around the tool 600. Moreover, the axis of the cutout 608 is off axis relative to the longitudinal axis of the tool 600. In some embodiments, the axis of the cutout 608 is at an approximately 45 degree angle relative to the longitudinal axis of the tool 600. In some embodiments, the axis of the cutout 608 can be at any angle relative to the longitudinal axis of the tool 600. For example, the angle may be approximately 5 degrees, 10 degrees, 15 degrees, 30 degrees, 70 degrees, 75 degrees, 85 degrees, etc. While shown with one receiver antenna 604, the tool 600 may include one to any number of receiver antennas positioned in cutouts.

The receiver antenna 604 may comprise one or more loops of wire running along the circumference of the body of the tool 600. The receiver antenna 604 may couple to a reception circuit (not specifically shown) which, in combination with the receiver antenna, detects electromagnetic waves or electromagnetic radiation. Based on one or both of the amplitude and phase of received electromagnetic signals, the tool 600 may be capable of determining the resistivity of the surrounding formations. In some embodiments, the cutout 606 and the cutout 608 may be on different parts of the tool 600. For example, the cutout 606 and the cutout 608 may be on drill collars, stabilizers, etc. The diameter of drill collars that include such cutouts may be in a range of four to nine inches. For example, the diameter of the drill collar may be 4¾ inches, 6¾ inches, 7 inches, 8 inches, 9 inches, etc. The distance from the transmitter antenna 602 to the receiver antenna 604 can be in a range of 6 to 112 inches. In some embodiments, the distance is 6 inches, 16 inches, 32 inches, 48 inches, etc.

The surfaces of the walls of the cutouts may be cut at various angles. FIGS. 7-9 illustrate examples of these different angles. FIG. 7 illustrates a cross-section of a cutout in a tool having wall surfaces with approximately uniform width, according to some embodiments of the invention. In particular, a cutout 700 includes an outer point 704 and an inner point 706. An antenna 702 is positioned in the cutout 700. As shown, the wall surfaces are approximately uniform in width from the inner point 706 to the outer point 704.

FIG. 8 illustrates a cross-section of a cutout in a tool having convergent wall surfaces, according to some embodiments of the invention. In particular, a cutout 800 includes an outer point 804 and an inner point 806. An antenna 802 is positioned in the cutout 800. As shown, the wall surfaces converge as the cutout is extended outward from the tool.

FIG. 9 illustrates a cross-section of a cutout in a tool having divergent wall surfaces, according to some embodiments of the invention. In particular, a cutout 900 includes an outer point 904 and an inner point 906. An antenna 902 is positioned in the cutout 900. As shown, the wall surfaces diverge as the cutout is extended outward from the tool. The cutouts within a tool may include any combination of the configurations shown in FIGS. 7-9. For example, all the cutouts may be configured as shown in FIG. 7. Alternatively, the transmitter antenna may be in a cutout shown in FIG. 8, while the receiver antennas may be in a cutout shown in FIG. 7.

Sleeves for Covering Cutouts in a Tool for Housing Antennas

Figure 10:
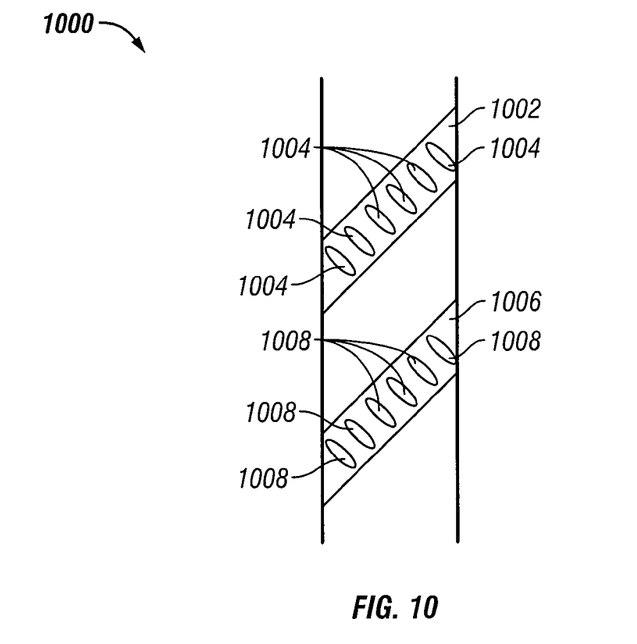
FIG. 10 illustrates a tool that is part of a tubular for downhole operations and having cutouts for antennas for electromagnetic wave resistivity that are covered by a sleeve with a number of slots, according to some embodiments of the invention.

FIG. 10 illustrates a tool that is part of a tubular for downhole operations and having cutouts for antennas for electromagnetic wave resistivity that are covered by a sleeve with a number of slots, according to some embodiments of the invention. In particular, FIG. 10 illustrates a tool 1000 that includes a sleeve 1002 and a sleeve 1006. The sleeve 1002 and the sleeve 1006 are both covering cutouts (as described above). In some embodiments, the sleeves are made of a non-magnetic material (such as non-magnetic stainless steel). In some embodiments, the outer diameter of the sleeve 1002 and the outer diameter of the sleeve 1006 are approximately the same as the diameter of the tool 1000.

The sleeve 1002 and the sleeve 1006 include a number of slotted regions 1004 and a number of slotted regions 1008, respectively. In some embodiments, the longitudinal axis of the slotted regions 1004 and the slotted regions 1008 is approximately perpendicular to the longitudinal axis of the antenna within the cutout (not shown in FIG. 10). In some embodiments, the width, length, number and spacing of slotted regions 1004 and slotted regions 1008 are chosen so a sufficient amount of the desired electromagnetic signal can propagate through the sleeves 1002 and the sleeve 1006, respectively, and into, or out from, the formation without adversely affecting the mechanical strength of the sleeves. Accordingly, the slotted regions 1004 and the slotted regions 1008 form an electromagnetically transparent window through the sleeves.

In some embodiments, the width of the slotted regions 1004 and 1008 are dependent on the width of the cutout region being covered. In some embodiments, if the width of the cutout is approximately 1.0 inch, the width of the slotted regions is approximately 0.75 inches. In some embodiments, if the width of the cutout is approximately 2.0 inches, the width of the slotted regions is approximately 0.375 inches. If the width of the cutout is approximately 3.0 inches, the width of the slotted regions may be approximately 0.25 inches. If the width of the cutout is approximately 4.0 inches, the width of the slotted regions may be approximately 0.187 inches. In some embodiments, each slotted region for a given sleeve includes N number of slots that are spaced apart about M degrees along the circumference of the sleeve. In some embodiments, N is 12 and M is approximately 30 degrees.

Figure 11:
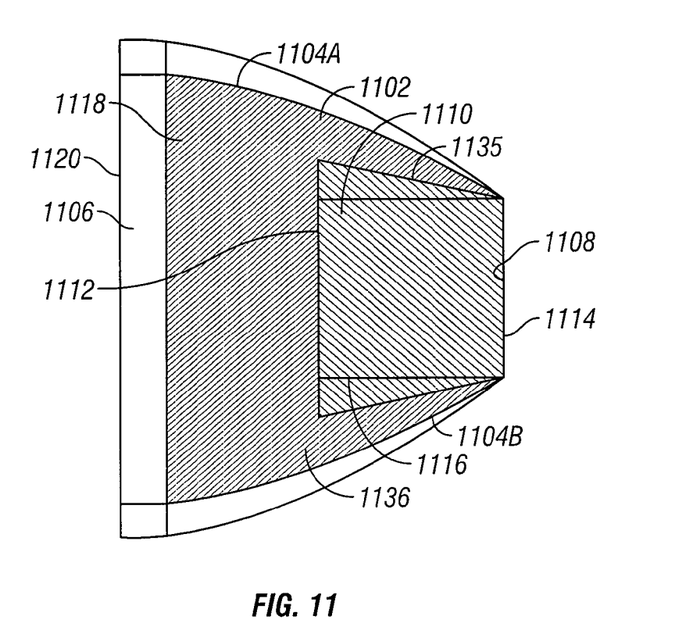
FIG. 11 illustrates a cross-section of one of the slots in the slotted regions of a sleeve covering a cutout in the tool, according to some embodiments of the invention.

FIG. 11 illustrates a cross-section of one of the slots in the slotted regions of a sleeve covering a cutout in the tool, according to some embodiments of the invention. A side wall 1104A and a side wall 1104B of the slot 1102 are beveled, wherein the slot 1102 is widest at an outer surface 1106 and narrowest at an inner surface 1108. As shown, an insert 1110 may be disposed in the slot 1102. The insert 1110 may be made of a rigid insulative plastic such as poly ether etherketone or another relatively stiff insulative material and configured so as to fit snugly into the bottom of slot 1102. The insert 1110 includes an outwardly facing surface 1112 and an inwardly facing surface 1114. When disposed in slot 1102, the inwardly facing surface 1114 is substantially aligned with the inner surface 1108.

The insert 1110 includes beveled side surfaces 1116, which may be beveled or tapered at a smaller angle than the bevel of the side walls 1104A-1104B of the slot 1102. In some embodiments, disposed atop the insert 1110 is a layer of sealing compound 1118. The sealing compound 1118 may be an elastomer, such as nitrile. Epoxy or certain other non-metallic compounds may also be used. In some embodiments, a recess 1120 may be left between the sealing compound 1118 and the outer surface 1106. The recess 1120 may be at various depths. In some embodiments, the recess 1120 is approximately 0.12 inches, helps prevent the sealing compound 1118 from becoming torn or punctured during drilling operations and while the tool is being inserted or withdrawn from the borehole. In some embodiments, during manufacture, the sealing compound 1118 is vulcanized so as to be retained in the slot 1102 atop the insert 1110 and within regions 1135 and 1136 around the perimeter of the insert 1110. The slots permit passage of the desired electromagnetic waves to and from the antennas, but prevent the intrusion of drilling fluid. The beveled edges and ends of slots allow the sealing compound 1118 to seal even tighter when hydrostatic pressure is applied to logging tool. The inserts also provide a puncture resistant barrier for the sealing compound 1110. In some embodiments, the slots may be constructed without the inserts. In some embodiments, the sidewalls of the slots and/or the inserts are not beveled. Further description of such sleeves is set forth in U.S. Pat. No. 5,563,512, with inventor Edward S. Mumby, that issued on Oct. 8, 1996, which is hereby incorporated by reference.

Wireline Operating Environment

Figure 12:
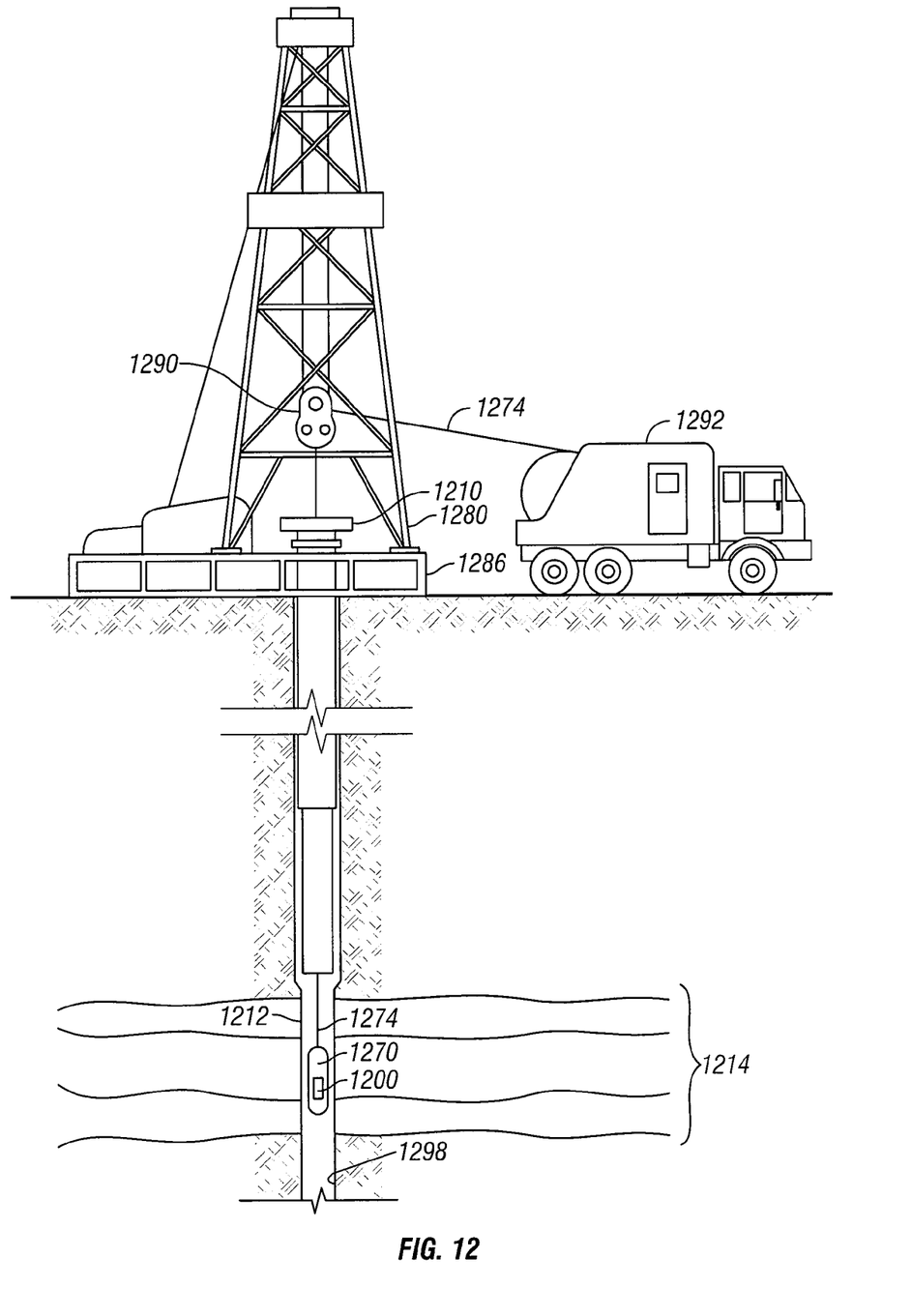
FIG. 12 illustrates a drilling well during wireline logging operations that includes cutouts for antennas for electromagnetic wave resistivity, according to some embodiments of the invention.

Some embodiments may be used in conjunction with wireline logging operations. FIG. 12 illustrates a drilling well during wireline logging operations that includes cutouts for antennas for electromagnetic wave resistivity, according to some embodiments of the invention. A drilling platform 286 is equipped with a derrick 288 that supports a hoist 290. Drilling of oil and gas wells is commonly carried out by a string of drill pipes connected together so as to form a drilling string that is lowered through a rotary table 210 into a wellbore or borehole 212. Here it is assumed that the drilling string has been temporarily removed from the borehole 212 to allow a wireline logging tool body 270, such as a probe or sonde, to be lowered by wireline or logging cable 274 into the borehole 212. Typically, the tool body 270 is lowered to the bottom of the region of interest and subsequently pulled upward at a substantially constant speed. During the upward trip, instruments included in the tool body 270 may be used to perform measurements on the subsurface formations 214 adjacent the borehole 212 as they pass by. The measurement data can be communicated to a logging facility 292 for storage, processing, and analysis. The logging facility 292 may be provided with electronic equipment for various types of signal processing. Similar log data may be gathered and analyzed during drilling operations (e.g., during Logging While Drilling, or LWD operations).

General

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A number of figures show block diagrams of systems and apparatus for communications between the surface of the Earth and multiple downhole tools, in accordance with some embodiments of the invention. A figure shows a flow diagram illustrating operations for communications between the surface of the Earth and multiple downhole tools, in accordance with some embodiments of the invention. The operations of the flow diagram are described with references to the systems/apparatus shown in the block diagrams. However, it should be understood that the operations of the flow diagram could be performed by embodiments of systems and apparatus other than those discussed with reference to the block diagrams, and embodiments discussed with reference to the systems/apparatus could perform operations different than those discussed with reference to the flow diagram.

Some or all of the operations described herein may be performed by hardware, firmware, software or a combination thereof. For example, the controlling of the transmission from the transmitter antennas may be performed by hardware, firmware, software or a combination thereof. To further illustrate, the processing of the electromagnetic waves received by the receiver antennas may be performed by hardware, firmware, software or a combination thereof. Upon reading and comprehending the content of this disclosure, one of ordinary skill in the art will understand the manner in which a software program can be launched from a machine-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. An apparatus comprising:
 a tubular to operate downhole, the tubular having a longitudinal axis and a circumferential cutout extending around a cutout axis that lies at an angle to the longitudinal axis of the tubular that is other than 90 degrees, the cutout thus extending at a diagonal relative to the longitudinal axis, wherein a width of the cutout is in a range of approximately one to four inches;
 an antenna positioned in the diagonally extending cutout, the antenna to perform at least one of a transmission or reception of an electromagnetic signal that has a path that is to traverse a subsurface formation; and
 a diagonally extending non-magnetic sleeve positioned within the diagonally extending cutout to cover the antenna therein, the sleeve having a plurality of openings, and further having outer sides conforming to wall surfaces of the cutout.

2. The apparatus of claim 1, wherein the cutout axis is at an approximately 45 degree angle relative to the longitudinal axis of the tubular.

3. The apparatus of claim 1, wherein the width of the cutout is approximately two inches.

4. The apparatus of claim 1, wherein the one or more openings is approximately perpendicular to the cutout axis.

5. The apparatus of claim 4, wherein a width of the one or more openings is less than one inch, and wherein the width of the openings is defined in approximately inverse proportion to the width of the cutout.

6. The apparatus of claim 4, wherein the width of the one or more openings is approximately equal to three-fourths divided by the width of the cutout.

7. The apparatus of claim 4, wherein the one or more openings are filled with a nonmetallic material.

8. The apparatus of claim 1, wherein the tubular is a drill string, and wherein the cutout is within a drill collar of the drill string.

9. The apparatus of claim 1, wherein the tubular is a drill string, and wherein the cutout is within a stabilizer of the drill string.

10. An apparatus comprising:
a tubular for downhole operations, the tubular having a longitudinal axis and comprising:
a transmitter antenna to emit an electromagnetic wave into a subsurface formation;
a first receiver antenna positioned in a first circumferential cutout in the tubular extending around a first cutout axis that lies at an angle to the longitudinal axis of the tubular that is other than 90 degrees, the first circumferential cutout thus extending at a diagonal relative to the longitudinal axis of the tubular, wherein a width of the first circumferential cutout is in a range of approximately one to six inches, wherein a diagonally extending non-magnetic first sleeve is positioned within the first circumferential cutout to cover the first receiver antenna, the first sleeve having a plurality of first openings and first outer sides conforming to first wall surfaces of the first circumferential cutout, the first receiver antenna to receive an induced electromagnetic wave produced from the electromagnetic wave that is emitted into the subsurface formation; and
a second receiver antenna positioned in a second circumferential cutout in the tubular extending around a second cutout axis that lies at an angle to the longitudinal axis of the tubular that is other than 90 degrees, the second circumferential cutout thus extending at a diagonal relative to the longitudinal axis of the tubular, wherein a width of the second circumferential cutout is in a range of approximately one to four inches, and wherein a diagonally extending non-magnetic second sleeve is positioned within the second circumferential cutout to cover the second receiver antenna, the second sleeve having a plurality of second openings and second outer sides conforming to second wall surfaces of the second circumferential cutout, the second receiver antenna to receive an induced electromagnetic wave produced from the electromagnetic wave that is emitted into the subsurface formation.

11. The apparatus of claim 10, wherein an average distance from the second receiver antenna to the transmitter antenna is in a range of 12 to 112 inches.

12. The apparatus of claim 11, wherein an average distance from the first receiver antenna to the transmitter antenna is in a range of 6 to 106 inches.

13. The apparatus of claim 10, wherein the first cutout axis and the second cutout axis are at an approximately 45 degree angle relative to the longitudinal axis of the tubular.

14. The apparatus of claim 10, wherein the width of the first cutout and the width of the second cutout are approximately two inches.

15. The apparatus of claim 10, wherein a width of the one or more second openings is approximately 0.375 inches and a width of at least one of the respective cutouts is approximately two inches.

16. The apparatus of claim 10, wherein a width of the openings in the sleeves is defined in approximately inverse proportion to a width of the cutout that includes a respective one of the sleeves.

17. A method comprising:
transmitting a transmit electromagnetic wave into a subsurface formation using a transmitter antenna disposed circumferentially around a tool for downhole operations; and
receiving a first induced electromagnetic wave, which is a result of the transmitted electromagnetic wave, with a first receiver antenna disposed circumferentially around the tool in a first circumferential cutout in the tool, wherein an axis of the first receiver antenna and a cutout axis of the first circumferential cutout are at an angle other than 90 degrees relative to a longitudinal axis of the tool, wherein the first circumferential cutout extends at a diagonal relative to the longitudinal axis and a width of the first circumferential cutout is in a range of approximately one to four inches, and wherein the tool includes a diagonally extending non-magnetic sleeve disposed within the first circumferential cutout to cover the first receiver antenna, the metallic sleeve having one or more openings and outer sides conforming to wall surfaces of the first circumferential cutout.

18. The method of claim 17, further comprising receiving a second induced electromagnetic wave, which is a result of the transmitted electromagnetic wave, with a second receiver antenna disposed circumferentially around the tool in a second circumferential cutout in the tool, wherein an axis of the second receiver antenna and an axis of the second circumferential cutout are at an angle other than 90 degrees relative to a longitudinal axis of the tool, wherein a width of the second circumferential cutout is in a range of one to four inches.

19. The method of claim 18, further comprising determining a resistivity of a section of the subsurface formation based on the first induced electromagnetic wave and the second induced electromagnetic wave.

20. The method of claim 17, wherein the first receiver antenna is approximately centered in the first circumferential cutout and wherein the second receiver antenna is approximately centered in the second circumferential cutout.

21. The method of claim 17, wherein the wall surfaces of the first cutout have approximately uniform width.

22. The method of claim 17, wherein a width of the openings is defined in approximately inverse proportion to a width of the first circumferential cutout.

* * * * *

UNITED STATES PATENT AND TRADEMARK OFFICE
CERTIFICATE OF CORRECTION

| | | |
|---|---|---|
| PATENT NO. | : 8,174,265 B2 | Page 1 of 1 |
| APPLICATION NO. | : 11/997988 | |
| DATED | : May 8, 2012 | |
| INVENTOR(S) | : Michael S. Bittar et al. | |

It is certified that error appears in the above-identified patent and that said Letters Patent is hereby corrected as shown below:

On page 2, under "Other Publications", line 19, delete "Lasminated" and insert
-- Laminated --, therefor.

In column 11, line 38, in Claim 10, delete "wherein" and insert -- and wherein --, therefor.

Signed and Sealed this
Twenty-fourth Day of July, 2012

David J. Kappos
*Director of the United States Patent and Trademark Office*